(12) United States Patent
Barker (10) Patent No.: US 11,985,955 B2
(45) Date of Patent: May 21, 2024

(54) ANIMAL PLAY PROTECTIVE GLOVE DEVICE

(71) Applicant: Penny Barker, Modesto, CA (US)

(72) Inventor: Penny Barker, Modesto, CA (US)

( * ) Notice: Subject to any disclaimer, the term of this patent is extended or adjusted under 35 U.S.C. 154(b) by 107 days.

(21) Appl. No.: 17/852,414

(22) Filed: Jun. 29, 2022

(65) Prior Publication Data
US 2023/0240266 A1  Aug. 3, 2023

Related U.S. Application Data

(60) Provisional application No. 63/306,232, filed on Feb. 3, 2022.

(51) Int. Cl.
*A01K 15/02* (2006.01)
*A41D 19/015* (2006.01)

(52) U.S. Cl.
CPC ...... *A01K 15/026* (2013.01); *A41D 19/01505* (2013.01)

(58) Field of Classification Search
CPC ............ A41D 19/015; A41D 19/01505; A41D 19/01576; A41D 19/01594; A01K 15/026; A01K 15/02
See application file for complete search history.

(56) References Cited

U.S. PATENT DOCUMENTS

| | | | | |
|---|---|---|---|---|
| 2003/0211808 A1* | 11/2003 | Yarbrough | ........... | A01K 15/025 446/327 |
| 2004/0102133 A1* | 5/2004 | Yarbrough | ........... | A01K 15/025 446/327 |
| 2010/0192281 A1* | 8/2010 | Koesterich | ............. | A41D 13/08 2/167 |
| 2017/0280794 A1* | 10/2017 | Parrish | ................... | A41D 19/01 |

* cited by examiner

*Primary Examiner* — Katherine M Moran
(74) *Attorney, Agent, or Firm* — Brennan, Manna & Diamond, LLC (57) ABSTRACT

The present invention relates to a novel animal glove training device. The device is designed to provide a modified glove for human use when interacting with puppies and other young animals. The device comprises a standard glove that has a leather stitched material on the palm side and fake fur on the back. Soft plastic and rubber strips line the outside of the fingers. Twisted chew ropes are wrapped between the finger portions. Squeaky toys are present inside the tips of the fingers, which are activated and make noise when a puppy bites them. An owner wears the gloves while engaging in play with or training their puppy.

18 Claims, 6 Drawing Sheets

ANIMAL PLAY PROTECTIVE GLOVE DEVICE

CROSS-REFERENCE TO RELATED APPLICATION

The present application claims priority to, and the benefit of, U.S. Provisional Application No. 63/306,232, which was filed on Feb. 3, 2022 and is incorporated herein by reference in its entirety.

FIELD OF THE INVENTION

The present invention relates generally to the field of animal training devices. More specifically, the present invention relates to an improved animal glove training device that provides a modified glove for human use when interacting with animals. Accordingly, the present disclosure makes specific reference thereto. Nonetheless, it is to be appreciated that aspects of the present invention are also equally applicable to other like applications, devices and methods of manufacture.

BACKGROUND

By way of background, this invention relates to improvements in animal training devices for working with puppies and other young animals. Anyone who owns, breeds, or works regularly with dogs and other animals, knows that puppies and other young animals are very playful. While this playfulness is cute, it can also be dangerous for those around them. For example, puppies and other young animals often want to engage in rough play by scratching and biting their owners and others. Further, their sharp, young teeth can be very destructive to the delicate skin on our hands. This causes some owners to be less engaging with their animals, as they tend to get hurt every time they try to play with the animals. This behavior also poses a serious risk of injury to younger children.

Thus, it is necessary for users with young animals to have a device that offers a fun and playful solution to engaging with their young animals. The disclosed device is more than a glove, it is also a toy that protects the owner's hands from sharp claws and teeth while working with small animals. The device ensures that owners can play, train, and bond with their energetic new puppies and other young animals in a safe, productive manner.

Therefore, there exists a long-felt need in the art for an animal glove training device that provides a modified glove for human use when interacting with puppies and other young animals. There is also a long-felt need in the art for an animal glove training device that allows trainers to protect their hands and fingers from sharp animal teeth. Further, there is a long-felt need in the art for an animal glove training device that includes a twisted rope connecting the fingers and squeakers in the fingertips. Moreover, there is a long-felt need in the art for a device that features a thick, sheepskin-like fur material on the exterior for protection. Further, there is a long-felt need in the art for an animal glove training device that offers a safe and effective way to prevent dogs and other animals from biting or scratching the skin of a trainer/owner. Finally, there is a long-felt need in the art for an animal glove training device that makes training dogs and other animals fun and safe for all ages.

The subject matter disclosed and claimed herein, in one embodiment thereof, comprises an animal glove training device. The device is designed to provide a modified glove for human use when interacting with puppies and other young animals. The device comprises a standard glove that comes in multiple colors and sizes. The glove has a leather stitched material on the palm side and fake fur on the back. Soft plastic and/or rubber strips line the outside of the fingers. Twisted chew ropes are wrapped between the finger portions. The woven rope is available in different sizes to accommodate all breeds, big and small. Squeaky toys are present inside the tips of the fingers, which are activated and make noise when a puppy bites them. An owner wears the glove while engaging in play with or training their puppy.

In this manner, the animal glove training device of the present invention accomplishes all of the foregoing objectives and provides users with a device that prevents dogs and other animals from scratching their owners' hands or puncturing skin with their sharp teeth. The device makes training dogs and other animals fun and safe for all ages.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an animal glove training device. The device is designed to provide a modified glove for human use when interacting with puppies and other young animals. The device comprises a standard glove component with leather stitched material on the palm side and fake fur on the back. Soft plastic and/or rubber strips line the outside of the fingers. Twisted chew ropes are wrapped between the finger portions. Squeaky toys are present inside the tips of the fingers, which are activated and make noise when a puppy bites them. An owner wears the glove device while engaging in play with or training their puppy.

In one embodiment, the animal glove training device comprises a standard glove component. The glove component can be any suitable glove as is known in the art, depending on the needs and/or wants of a user. The glove component is manufactured in multiple colors and sizes (i.e., youth, adult, or one size fits all). Typically, the glove component comprises a palm side and a back side. In one embodiment, the palm side and the back side are one integral piece, and in another embodiment, the palm side and the back side are mated together to form the glove component. In either embodiment, the palm side and the back side form a hollow, interior cavity, or opening, for receiving a user's hand. Additionally, the glove component comprises four finger extension components and one thumb extension component which extend out from a palm side of the glove component. The four finger extensions and one thumb extension have closed ends and are secured to the palm side of the glove component, as an integral piece. The four finger extensions and one thumb extension also comprise hollow cavities or openings for receiving a user's fingers or thumb, when a user's hand is inserted into the opening formed between the palm side and the back side of the glove component.

For example, the glove component is placed on a user's hand, wherein a user's thumb extends through the thumb extension and is free to move. Furthermore, a user's fingers extend through the finger extensions and are free to move, such that a user's thumb and fingers are contained within the glove component, to protect a user's hands and fingers when engaging with dogs and other animals.

In one embodiment, the animal glove training device is manufactured from leather, suede, burlap, polyesters, etc., or any other suitable durable material as is known in the art. Typically, the device comprises multiple layers of material secured together, which makes the device thick and durable, such that a dog's or other animal's sharp teeth and claws cannot pierce it. The material is secured together via any suitable securing means as is known in the art, such as sewing, gluing, etc.

In yet another embodiment, the animal glove training device is manufactured from a material that is water resistant, such that a user can use it around water and not worry about a dog's drool/saliva on the device.

In one embodiment, the animal glove training device comprises a securing means for securing the glove component to a user's hand. The securing means is typically an elasticized cuff that is secured to the perimeter opening of the glove component. Typically, the elasticized cuff is sewn to the glove component, but can be secured in any suitable means as is known in the art. The elasticized cuff acts to fit snugly around a user's wrist, securing the glove component to the user's hand. In another embodiment, the glove component comprises a fastening strap that wraps circumferentially around the palm side of the glove component to the back side of the glove component and is secured via hook and loop securing means, or any other suitable securing means as is known in the art. The fastening strap would typically be elasticized to securely wrap around a user's wrist area, securing the glove component to the user's hand, but could be manufactured of any other suitable material as is known in the art.

In one embodiment, the animal glove training device comprises a leather stitched material on the palm side and fake fur on the back side. Any suitable material can be utilized on the palm side and/or the back side, depending on the needs and/or wants of a user. The additional leather material helps to give a dog a new texture or additional material to chew on. The fur material entices the dog to interact with the glove device. Typically, the additional material is secured to the glove component via sewing, gluing, etc., or any other suitable securing means as is known in the art.

In another embodiment, the animal glove training device comprises a plurality of soft plastic and/or rubber strips that line the outside of the finger extensions. The soft plastic and/or rubber strips act to provide additional textures and/or material for a dog to chew on when interacting with the glove device. The soft plastic and/or rubber strips are typically manufactured of the same material as standard chew toys, and thus entice the dog to chew on the glove device. Any other suitable material as is known in the art can be secured to the finger extensions of the glove component. Further, the plurality of soft plastic and/or rubber strips can be secured to the finger extensions via any suitable securing means as is known in the art, such as sewing, gluing, etc.

In yet another embodiment, the animal glove training device comprises twisted chew ropes that are wrapped between the finger extensions of the glove component, allowing a user's fingers to still be mobile. The chew ropes are available in different sizes and lengths to accommodate all breeds of dogs, big and small, as well as to accommodate various sizes of glove devices. Typically, the chew ropes are woven ropes, but can be any suitable material as is known in the art, such as nylon, cotton, etc. The chew ropes are wrapped around and between the finger extensions of the glove component and are secured to the glove component via any suitable securing means as is known in the art, such as sewing, gluing, etc. The chew ropes act to entice dogs and other animals to chew and/or interact with the glove device.

In another embodiment, the animal glove training device comprises at least one squeaker toy embedded in each of the finger extensions and/or thumb extension. Specifically, the squeaker toy is embedded into the tip of each finger/thumb extension and acts to squeak and/or make noise when a dog bites them. The squeaker toy can be embedded into any other suitable portion of the glove component, depending on the needs and/or wants of a user. Any suitable number of squeaker toys can be utilized in each finger/thumb extension, depending on the needs and/or wants of a user. Further, the at least one squeaker toy can be secured to the finger/thumb extensions via any suitable securing means as is known in the art. Typically, the squeakers are small enough that they should be embedded into the glove component instead of secured to the surface, such that the dog or other animal does not chew it off the surface of the glove device and swallow it.

In yet another embodiment, the animal glove training device is comprised of a plurality of indicia.

In yet another embodiment, a method of training young animals while protecting a user's hands and fingers from sharp teeth and claws is described. The method includes the steps of providing an animal glove training device comprising a standard glove with leather stitched material on the palm side and fake fur on the back, twisted chew ropes are wrapped between the finger portions, and squeaker toys are embedded in the fingertips. The method also comprises inserting a user's hand into the glove device, such that a user can interact with a dog or other animal. Further, the method comprises engaging and/or training with a young dog or other animal. Finally, utilizing the device to protect a user's hand from bites or scratches during training and/or engaging with the animal.

In yet another embodiment of the present invention, the animal glove training device is disclosed for providing a modified glove for human use when interacting with puppies and other young animals. The device comprises a standard glove that comes in multiple colors and sizes. The glove has a leather stitched material on the palm side and fake fur on the back, as well as rubber strips, chew ropes and squeakers secured to it. In use, a user inserts their hand into the glove component opening and pulls the glove component onto their fingers and over their hand and secures it. A user wears the glove device while engaging in play with or training their puppy or other young animal. The device prevents dogs and other animals from scratching their owners' hands or puncturing skin with their sharp teeth. The device makes training dogs and other animals fun and safe for all ages.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for an animal glove training device that provides a modified glove for human use when interacting with puppies and other young animals. There is also a long-felt need in the art for an animal glove training device that allows trainers to protect their hands and fingers from sharp animal teeth. Further, there is a long-felt need in the art for an animal glove training device that includes a twisted rope connecting the fingers and squeakers in the fingertips. Moreover, there is a long-felt need in the art for a device that features a thick, sheepskin-like fur material on the exterior for protection. Further, there is a long-felt need in the art for an animal glove training device that offers a safe and effective way to prevent dogs and other animals from biting or scratching the skin of a trainer/owner. Finally, there is a long-felt need in the art for an animal glove training device that makes training dogs and other animals fun and safe for all ages.

The present invention, in one exemplary embodiment, is a novel animal glove training device. The device is designed to provide a modified glove for human use when interacting with puppies and other young animals. The glove has a leather stitched material on the palm side and fake fur on the back. Soft plastic and/or rubber strips line the outside of the fingers. Twisted chew ropes are wrapped between the finger portions. Squeaky toys are present inside the tips of the fingers, which are activated and make noise when a puppy bites them. An owner wears the glove while engaging in play with or training their puppy. The present invention also includes a novel method of training young animals while protecting a user's hands and fingers from sharp teeth and claws. The method includes the steps of providing an animal glove training device comprising a standard glove with leather stitched material on the palm side and fake fur on the back, twisted chew ropes are wrapped between the finger portions, and squeaker toys are embedded in the fingertips. The method also comprises inserting a user's hand into the glove device, such that a user can interact with a dog or other animal. Further, the method comprises engaging and/or training with a young dog or other animal. Finally, utilizing the device to protect a user's hand from bites or scratches during training and/or engaging with the animal.

Figure 1:
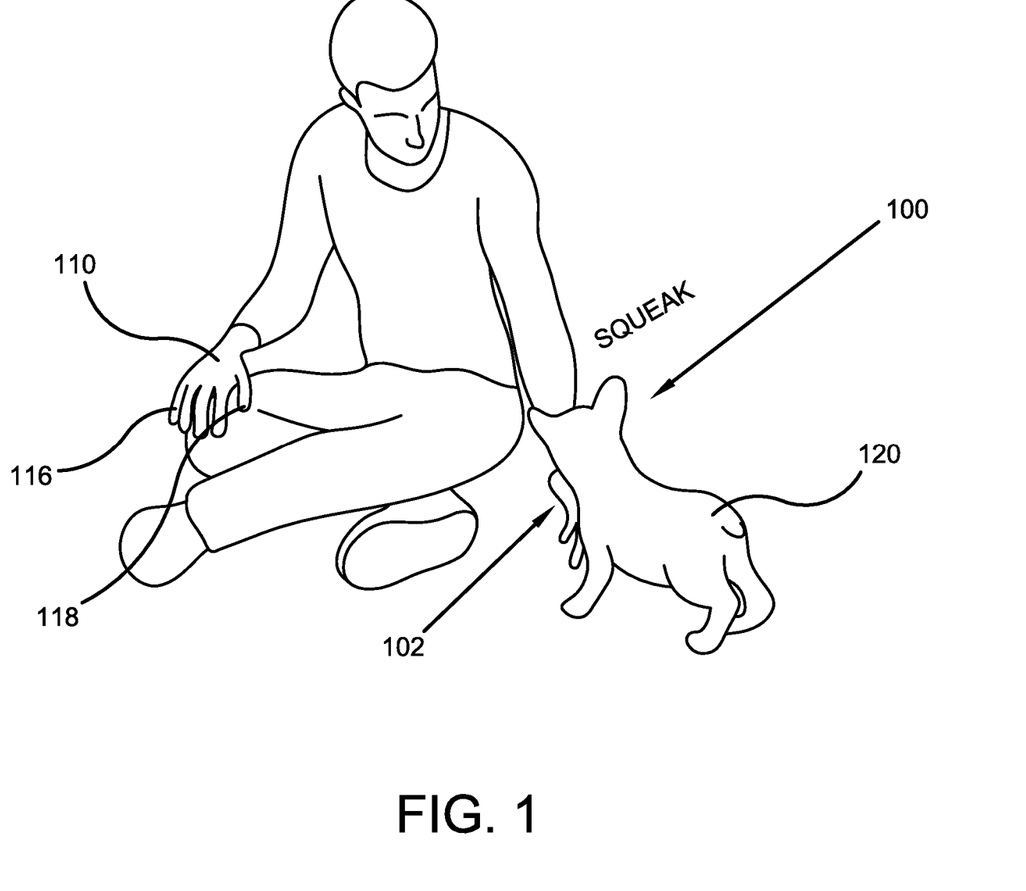
FIG. 1 illustrates a perspective view of one potential embodiment of the animal glove training device of the present invention showing how the fingertips squeak when bitten in accordance with the disclosed architecture.

Referring initially to the drawings, FIG. 1 illustrates a perspective view of one embodiment of the animal glove training device 100 of the present invention. In the present embodiment, the animal glove training device 100 is an improved animal training device that prevents dogs or other animals from scratching or biting their owner's hands. The device 100 is especially designed to allow any pet owner, pet trainer, animal boarding employee, etc., or any other suitable user as is known in the art, to safely train and engage with their pet. More specifically, the device 100 comprises a standard glove or glove component 102. The glove component 102 can be any suitable glove as is known in the art and is manufactured in multiple colors and sizes (i.e., youth, adult, or one size fits all). A user wears the glove device 100 while engaging in play with or training their puppy or other young animal.

Furthermore, the glove component 102 comprises a palm side 104 and a back side 106. In one embodiment, the palm side 104 and the back side 106 are one integral piece, and in another embodiment, the palm side 104 and the back side 106 are mated together to form the glove component 102. In either embodiment, the palm side 104 and the back side 106 form a hollow, interior cavity, or opening 108, for receiving a user's hand 110. Additionally, the glove component 102 comprises four finger extension components 112 and one thumb extension component 114 which extend out from a palm side 104 of the glove component 102. The four finger extensions 112 and one thumb extension 114 have closed ends and are secured to the palm side 104 of the glove component 102, as an integral piece. The four finger extensions 112 and one thumb extension 114 also comprise hollow cavities or openings for receiving a user's fingers 116 or thumb 118 when a user's hand 110 is inserted into the opening 108 formed from the palm side 104 and the back side 106 of the glove component 102.

For example, the glove component 102 is placed on a user's hand 110, wherein a user's thumb 118 extends through the thumb extension 114 and is free to move. Furthermore, a user's fingers 116 extend through the finger extensions 112 and are free to move, such that a user's thumb 118 and fingers 116 are contained within the glove component 102, to protect a user's hands 110 and fingers 116 when engaging with dogs 120 and other animals.

Furthermore, the animal glove training device 100 shown in FIG. 1, is typically manufactured from leather, suede, burlap, or polyesters, etc., or any other suitable durable material as is known in the art, such as but not limited to, Kevlar, nylon, etc. Generally, the animal glove training device 100 is also manufactured from a material that is water resistant or water permeable, or the glove component 102 comprises a coating that is water resistant or water permeable, such that a user can use the device 100 around water and not worry about a dog's drool/saliva on the device 100. Typically, the device 100 comprises multiple layers of material secured together, which makes the device 100 thick and durable, such that a dog's or other animal's sharp teeth and claws cannot pierce it. The material is secured together via any suitable securing means as is known in the art, such as sewing, gluing, etc. Any suitable number of layers can be used to make the device 100 as is known in the art, depending on the needs and/or wants of a user.

Figure 2:
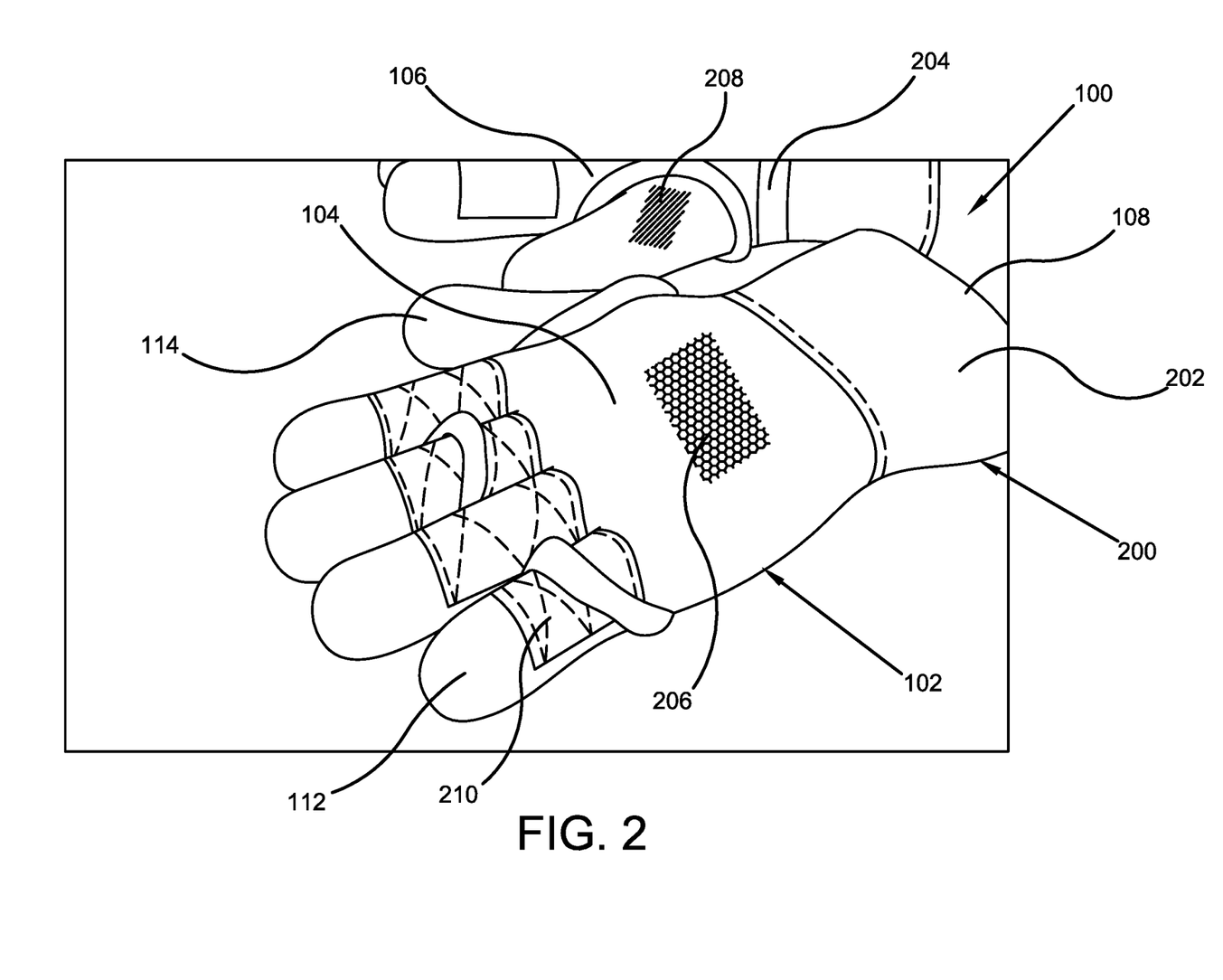
FIG. 2 illustrates a perspective view of one potential embodiment of the animal glove training device of the present invention showing the chew ropes permanently woven around the fingers in accordance with the disclosed architecture.

As shown in FIG. 2, the animal glove training device 100 comprises a securing means 200 for securing the glove component 102 to a user's hand 110. The securing means 200 is typically an elasticized cuff 202 that is secured to the perimeter opening 108 of the glove component 102. Typically, the elasticized cuff 202 is sewn to the glove component 102, but can be secured in any suitable means as is known in the art. The elasticized cuff 202 acts to fit snugly around a user's wrist, securing the glove component 102 to the user's hand 110. In another embodiment, the glove component 102 comprises a fastening strap 204 that wraps circumferentially around the palm side 104 of the glove component 102 to the back side 106 of the glove component 102 and is secured via hook and loop securing means, or any other suitable securing means as is known in the art. The fastening strap 204 would typically be elasticized to securely wrap around a user's wrist area, securing the glove component 102 to the user's hand 110, but could be manufactured of any other suitable material as is known in the art.

Furthermore, the animal glove training device 100 comprises a leather stitched material 206 on the palm side 104 and fake fur material 208 on the back side 106. Any suitable material can be utilized on the palm side 104 and/or the back side 106, depending on the needs and/or wants of a user. The additional leather material 206 helps to give a dog 120 a new texture or additional material to chew on. The fake or real fur material 208 entices the dog 120 to interact with the glove device 100. Typically, the additional material is secured to the glove component 102 via sewing, gluing, etc., or any other suitable securing means as is known in the art.

In another embodiment, the animal glove training device 100 comprises a plurality of soft plastic and/or rubber strips 210 that line the outside of the finger extensions 112. The soft plastic and/or rubber strips 210 act to provide additional textures and/or material for a dog 120 to chew on, when interacting with the glove device 100. The soft plastic and/or rubber strips 210 are typically manufactured of the same material as standard chew toys, and thus entice the dog 120 to chew on the glove device 100. Any other suitable material as is known in the art can be secured to the finger extensions 112 of the glove component 102. Further, the plurality of soft plastic and/or rubber strips 210 can be secured to the finger extensions 112 via any suitable securing means as is known in the art, such as sewing, gluing, etc.

In yet another embodiment, the animal glove training device 100 is comprised of a plurality of indicia 212. Specifically, the glove component 102 of the animal glove training device 100 may include advertising, a trademark, or other letters, designs, or characters, printed, painted, stamped, or integrated into the glove component 102, or any other indicia 212 as is known in the art. Specifically, any suitable indicia 212 as is known in the art can be included, such as but not limited to, patterns, logos, emblems, images, symbols, designs, letters, words, characters, animals, advertisements, brands, etc., that may or may not be dog or pet/brand related.

Figure 3:
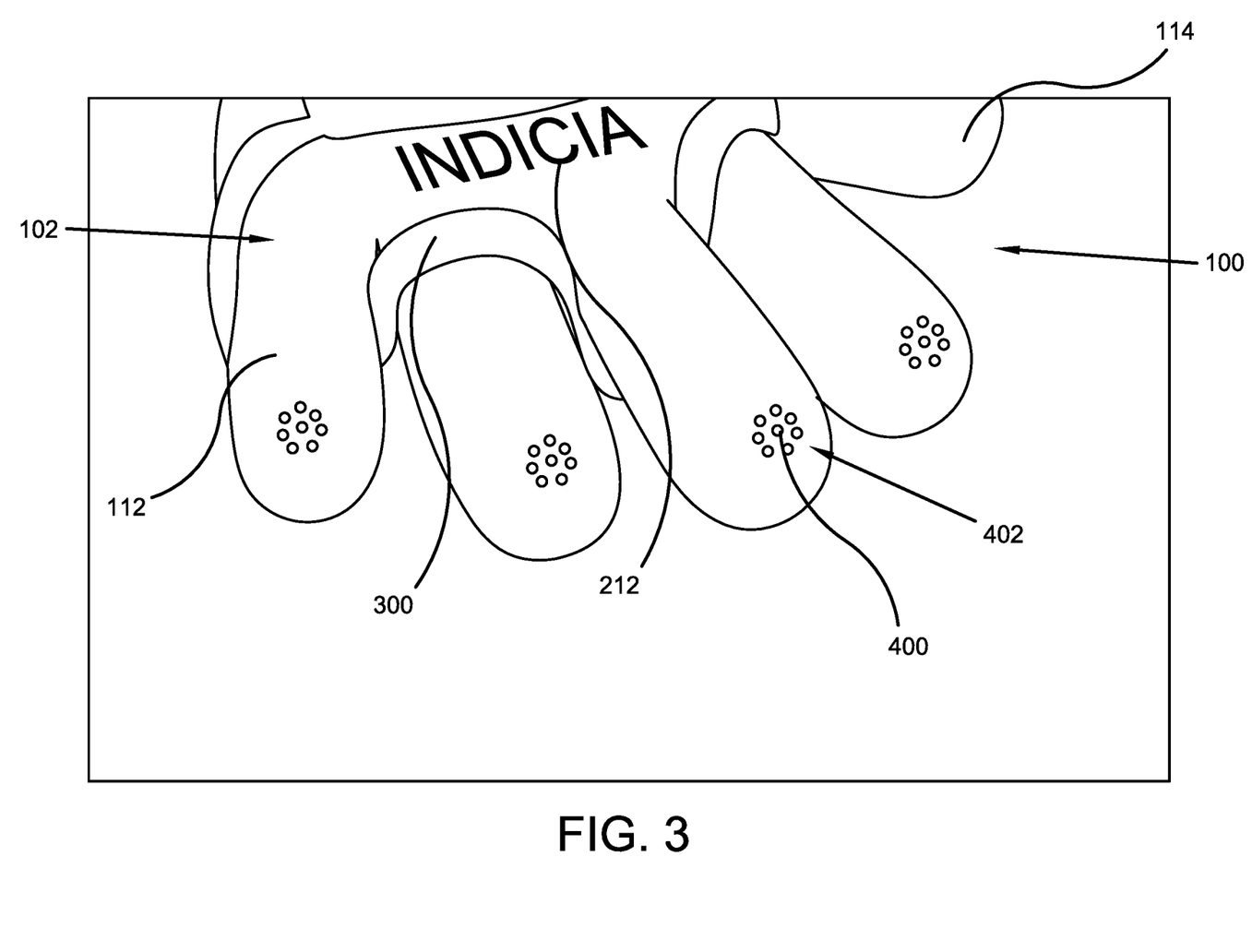
FIG. 3 illustrates a perspective view of one potential embodiment of the animal glove training device of the present invention showing the squeaky toys embedded in the fingertips in accordance with the disclosed architecture.

As shown in FIG. 3, the animal glove training device 100 comprises twisted chew ropes 300 that are wrapped between the finger extensions 112 of the glove component 102, allowing a user's fingers 116 to still be mobile. The chew ropes 300 are available in different sizes and lengths to accommodate all breeds of dogs 120, big and small, as well as to accommodate various sizes of glove devices 100. Typically, the chew ropes 300 are woven ropes, but can be any suitable material as is known in the art, such as nylon, cotton, etc. The chew ropes 300 are wrapped around and between the finger extensions 112 of the glove component 102 and are secured to the glove component 102 via any suitable securing means as is known in the art, such as sewing, gluing, etc. The chew ropes 300 act to entice dogs 120 and other animals to chew and/or interact with the glove device 100. Any number of chew ropes 300 can be utilized with the glove device 100 as is known in the art, depending on the needs and/or wants of a user.

Figure 4:
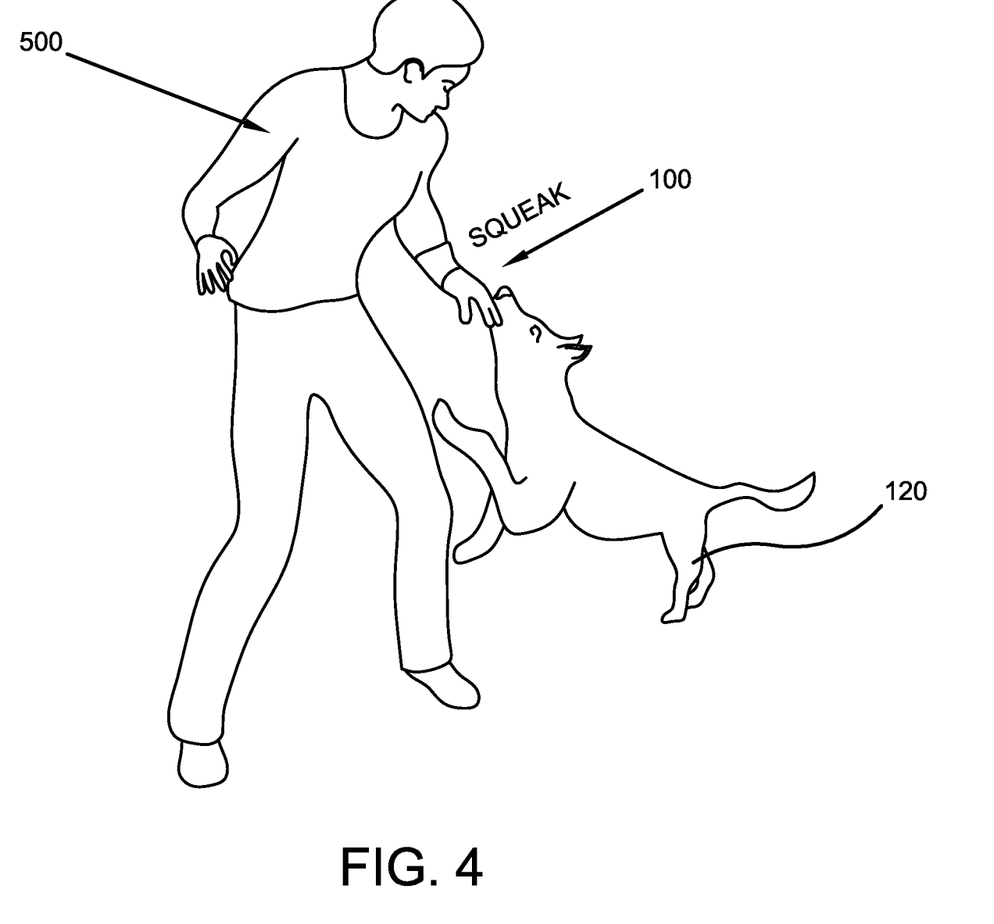
FIG. 4 illustrates a perspective view of one potential embodiment of the animal glove training device of the present invention showing a puppy chewing on the device in accordance with the disclosed architecture.

As shown in FIGS. 3-4, the animal glove training device 100 comprises at least one squeaker toy 400 embedded in each of the finger extensions 112 and/or thumb extension 114. Specifically, the squeaker toy 400 is embedded into the tip 402 of each finger 112/thumb 114 extension and acts to squeak and/or make noise when a dog 120 bites them. The squeaker toy 400 can be embedded into any other suitable portion of the glove component 102, depending on the needs and/or wants of a user. Any suitable number of squeaker toys 400 can be utilized in each finger 112/thumb 114 extension, depending on the needs and/or wants of a user. Further, the at least one squeaker toy 400 can be secured to the finger 112/thumb 114 extensions via any suitable securing means as is known in the art. Typically, the squeakers 400 are small enough that they should be embedded into the glove component 102 instead of secured to the surface, such that the dog 120 or other animal does not chew it off the surface of the glove device 100 and swallow the squeaker toy 400.

Figure 5:
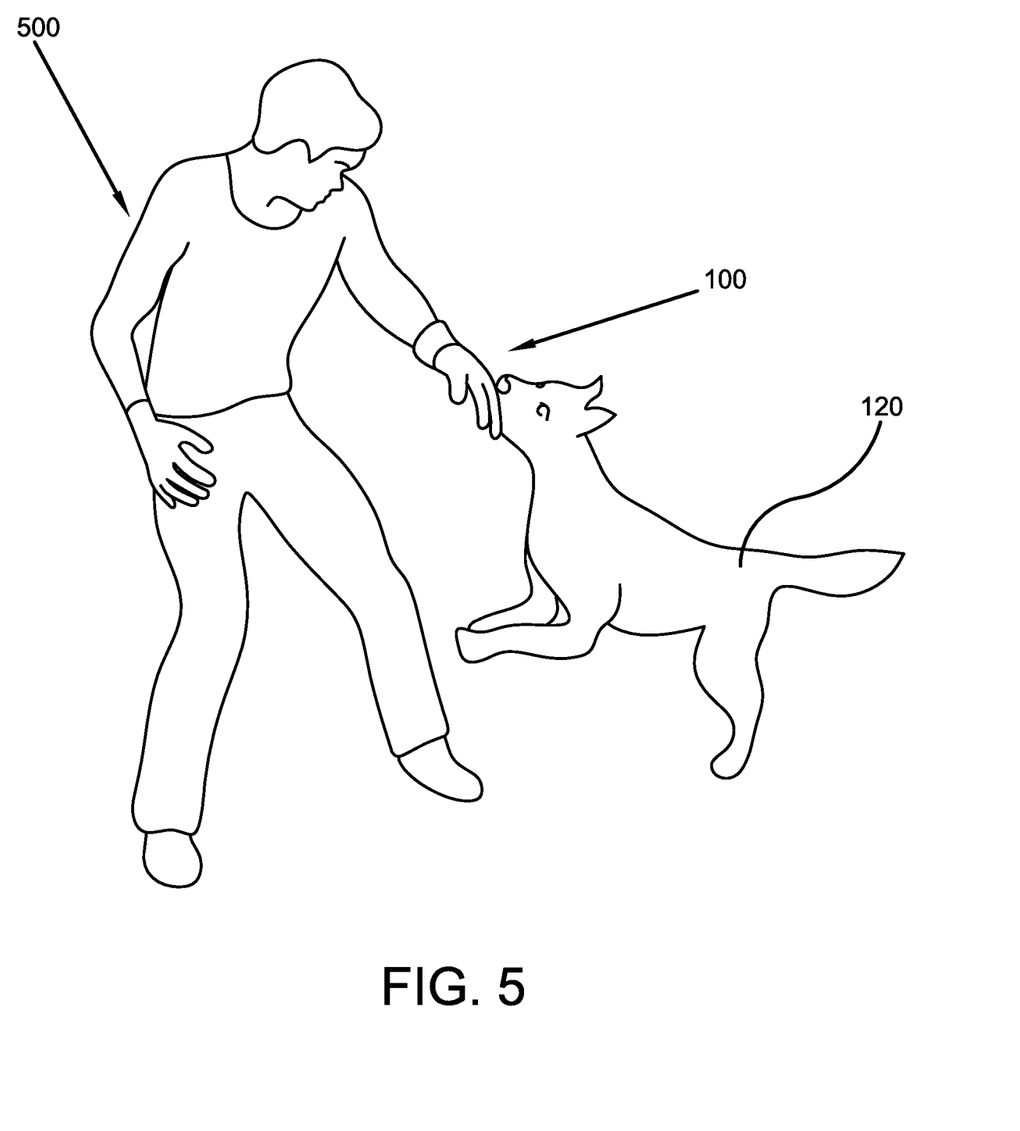
FIG. 5 illustrates a perspective view of one potential embodiment of the animal glove training device of the present invention showing the device protecting a user's hand when bitten in accordance with the disclosed architecture.

FIG. 5 discloses the animal glove training device 100 in use. The animal glove training device 100 is disclosed for providing a modified glove for human use when interacting with puppies and other young animals. The device 100 comprises a glove component 102 that comes in multiple colors and sizes. The glove component 102 has a leather stitched material 206 on the palm side 104 and fake fur material 208 on the back side 106, as well as rubber strips 210, chew ropes 300 and squeaker toys 400 secured to it. In use, a user 500 inserts their hand 110 into the glove component opening 108 and pulls the glove component 102 onto their fingers 116 and over their hand 110 and secures it. A user 500 wears the glove device 100 while engaging in play with or training their puppy 120 or other young animal. The device 100 prevents dogs 120 and other animals from scratching their owners' hands 110 or puncturing skin with their sharp teeth. The device 100 makes training dogs 120 and other animals fun and safe for all ages.

Figure 6:
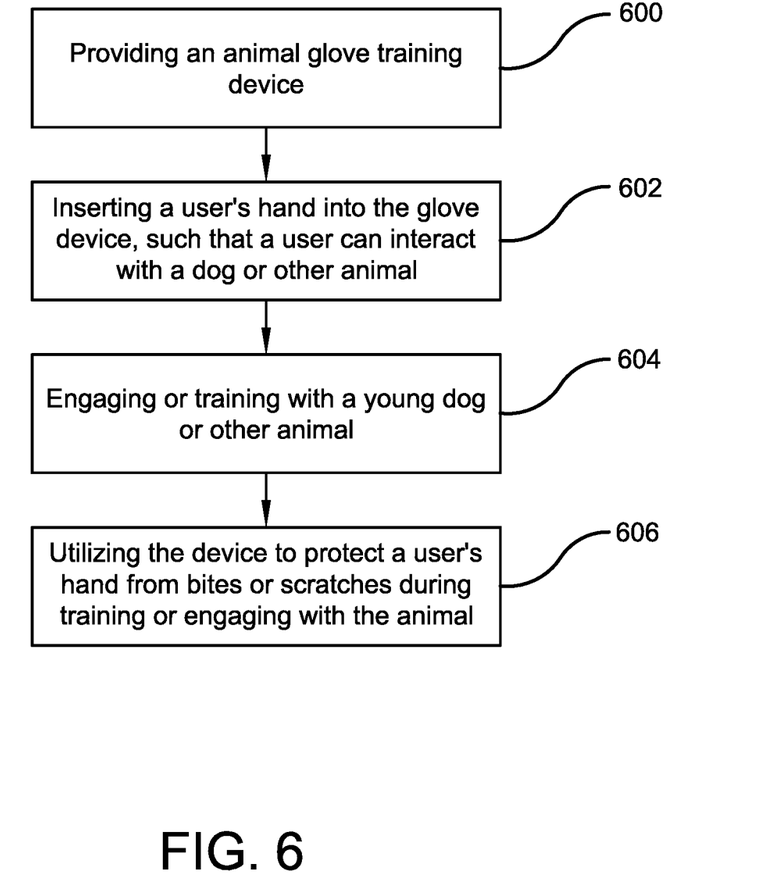
FIG. 6 illustrates a flowchart showing the method of training young animals while protecting a user's hands and fingers from sharp teeth and claws with one potential embodiment of the animal glove training device of the present invention in accordance with the disclosed architecture.

FIG. 6 illustrates a flowchart of the method of training young animals while protecting a user's hands and fingers from sharp teeth and claws. The method includes the steps of at 600, providing an animal glove training device comprising a standard glove with leather stitched material on the palm side and fake fur on the back, twisted chew ropes are wrapped between the finger portions, and squeaker toys are embedded in the fingertips. The method also comprises at 602, inserting a user's hand into the glove device, such that a user can interact with a dog or other animal. Further, the method comprises at 604, engaging and/or training with a young dog or other animal. Finally, at 606, utilizing the device to protect a user's hand from bites or scratches during training and/or engaging with the animal.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "animal glove training device", "glove device", and "device" are interchangeable and refer to the animal glove training device 100 of the present invention.

Notwithstanding the foregoing, the animal glove training device 100 of the present invention can be of any suitable size and configuration as is known in the art without affecting the overall concept of the invention, provided that it accomplishes the above-stated objectives. One of ordinary skill in the art will appreciate that the animal glove training device 100 as shown in FIGS. 1-6 is for illustrative purposes only, and that many other sizes and shapes of the animal glove training device 100 are well within the scope of the present disclosure. Although the dimensions of the animal glove training device 100 are important design parameters for user convenience, the animal glove training device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An animal glove training device for safely training an animal and protecting a user's hand, the animal glove training device comprising:
   a glove component comprising four finger extension components and one thumb extension component for receiving a user's fingers and thumb;
   a plurality of rubber strips that line an outside of the four finger extension components and one thumb extension component to help engage the animal during training;
   a chew rope that is wrapped around and between the four-finger extension components; and
   at least one squeaker toy that is embedded into a tip of each of the four finger extension components and the thumb extension component and squeaks when the animal bites the at least one squeaker toy.

2. The animal glove training device of claim 1, wherein the glove component further comprises a palm side and a back side secured together to form an opening for the user's hand.

3. The animal glove training device of claim 2, wherein the glove component further comprises an elasticized cuff for securing the glove component to the user's hand.

4. The animal glove training device of claim 2, wherein the glove component further comprises a fastening strap for securing the glove component to the user's hand.

5. The animal glove training device of claim 1, wherein the glove component further comprises multiple layers of material secured together for increased strength.

6. The animal glove training device of claim 2, wherein the glove component further comprises a leather material secured to the palm side of the glove component.

7. The animal glove training device of claim 6, wherein the glove component further comprises a fur material secured to the back side of the glove component.

8. The animal glove training device of claim 1, wherein the glove component further comprises a plurality of indicia.

9. The animal glove training device of claim 1, wherein the glove component is manufactured in multiple sizes.

10. The animal glove training device of claim 1, wherein the glove component is manufactured of a leather.

11. An animal glove training device for safely training an animal and protecting a user's hand, the animal glove training device comprising:
    a glove component comprising a palm side and a back side secured together to form an opening sized and configured to accommodate the user's hand, a plurality of finger extension components and a thumb extension component for receiving a user's fingers and thumb;
    a plurality of rubber strips that line an outside of the plurality of finger extension components;
    a chew rope wrapped around and between the plurality of finger extension components; and
    at least one squeaker toy embedded into a tip of each of the plurality of finger extension components and the thumb extension component that squeaks when bitten by the animal;
    a leather material secured to the palm side of the glove component; and
    a fur material secured to the back side of the glove component.

12. The animal glove training device of claim 11, wherein the glove component further comprises a plurality of indicia.

13. The animal glove training device of claim 11, wherein the glove component is configured to be manufactured in multiple sizes.

14. The animal glove training device of claim 11, wherein the glove component is manufactured of a leather.

15. The animal glove training device of claim 11, wherein the glove component further comprises a plurality of layers of material secured together for strength.

16. The animal glove training device of claim 11, wherein the glove component further comprises an elasticized cuff for securing the glove component to the user's hand.

17. The animal glove training device of claim 11, wherein the glove component further comprises a fastening strap for securing the glove component to the user's hand.

18. A method of training an animal while protecting a user's hand and fingers from sharp teeth and claws, the method comprising the steps of:
- providing an animal glove training device;
- inserting the user's hand into the animal glove training device, such that the user can interact with the animal; and
- engaging or training the animal, wherein the animal glove training device comprises a glove component with a plurality of finger portions, a palm side and a back side, and further wherein the glove component comprises a leather stitched material on the palm side, and a fake fur on the back side, a twisted chew rope wrapped between the plurality of finger portions, and a squeaker toy embedded in a tip of each of the plurality of finger portions.

* * * * *